June 11, 1946.   W. R. MAYBERRY   2,401,952
THREE PHASE TRANSFORMER
Filed Sept. 10, 1943   2 Sheets-Sheet 1

INVENTOR.
WALTER R. MAYBERRY
BY
　　Austin R. Woolfolk
　　　ATTORNEY.

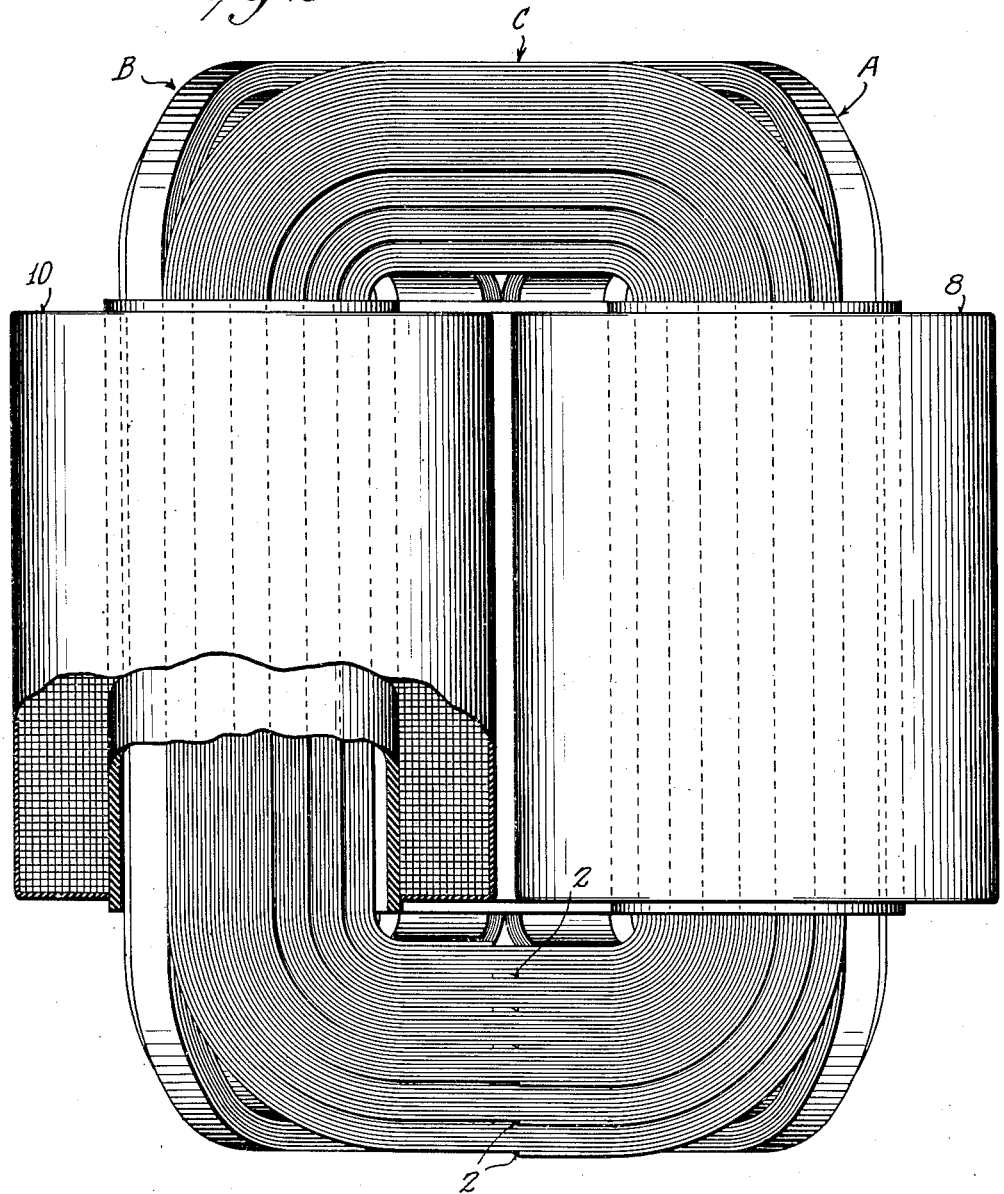

Patented June 11, 1946

2,401,952

UNITED STATES PATENT OFFICE 2,401,952

THREE-PHASE TRANSFORMER

Walter R. Mayberry, Zanesville, Ohio, assignor to Line Material Company, South Milwaukee, Wis., a corporation of Delaware Application September 10, 1943, Serial No. 501,736

4 Claims. (Cl. 175—356)

This invention relates to three phase transformers and is particularly directed to the core construction.

Three phase transformers have heretofore been made of the stacked core construction which a multitude of pieces of flat core steel were joined together by stacking to form the necessary shape of core for the three groups of conducting winding assemblies of the three phase transformer. This stacking operation entailed a high labor cost due to the long process of interleaving all of the small pieces of steel. Even in the initial stacking operation some mechanical stress was always imparted to the core pieces in the practical manufacture of the transformer and this reduced the efficiency of the transformer. Also in the stacked core construction it is necessary for the magnetic flux to traverse a multitude of air gaps and to travel cross grain at the corners of the core and this entailed a certain amount of loss in the core of the transformer.

This invention is designed to overcome the above noted defects, and objects of this invention as to provide a novel form of three phase transformer which has its core structure formed of wound magnetic ribbon, which is wound into three closed cores each preferably composed of a plurality of sections, in which no unusual care is required in the assembly of the parts of the device, in which no bending, machining or other working of the core structure is required after annealing and which therefore provides a finished core free from stresses, and in which short-circuiting of the laminations is avoided as the oxide film formed on the laminations is preserved and is not scraped off as there is no working subsequent to annealing.

Further objects are to provide a three phase transformer which has three identical cores each having a pair of straight leg portions with each of the three conducting winding assemblies including the primaries and secondaries surrounding a straight leg portion of two of the cores, with the cores extending from the window of one conducting winding assembly directly through the window of the next conducting winding assembly, and with the cores free from transverse cuts or gaps thereby providing a three phase transformer which requires a low exciting current for the transformer, and thus allows a more economical design of the three phase transformer by increasing the flux density and yet not exceeding the allowable limits of exciting current, and in which the path of the magnetic flux follows the grain in the magnetic ribbon due to rolling, thus furthering economy by reducing core losses and exciting current and allowing the material to be worked economically.

Further objects are to provide a three phase transformer having three cores each of which is formed of staggered closed wound sections with two cores interlinking with a conducting winding assembly and jointly shaped to substantially fill the window of the conducting winding assembly, thus providing a good space factor and allowing the winding of the conducting winding assemblies as circular coils with all of the inherent advantages resulting therefrom such as the ability of the conducting winding to resist distorting forces due to short-circuit or similar conditions as the circular coil is considerably stronger than rectangular coils, and in addition to the mechanical strength entails less danger of damaging the insulation during winding than where a rectangular conducting winding assembly is employed as it requires less tension on the wire and no pounding of the coil to make a firm coil.

Further objects are to provide a three phase transformer in which the axes of three circular conducting winding assemblies are arranged in parallelism and are located at the apexes of an equilateral triangle and in which the closed wound cores are also symmetrically arranged thus providing a three phase transformer which is symmetrical throughout and which is, therefore, adapted to be mounted in a circular can.

An embodiment of the invention is shown in the accompanying drawings, in which:

Figure 2 is an elevation of the transformer, with parts broken away and parts in section.

Figure 1:
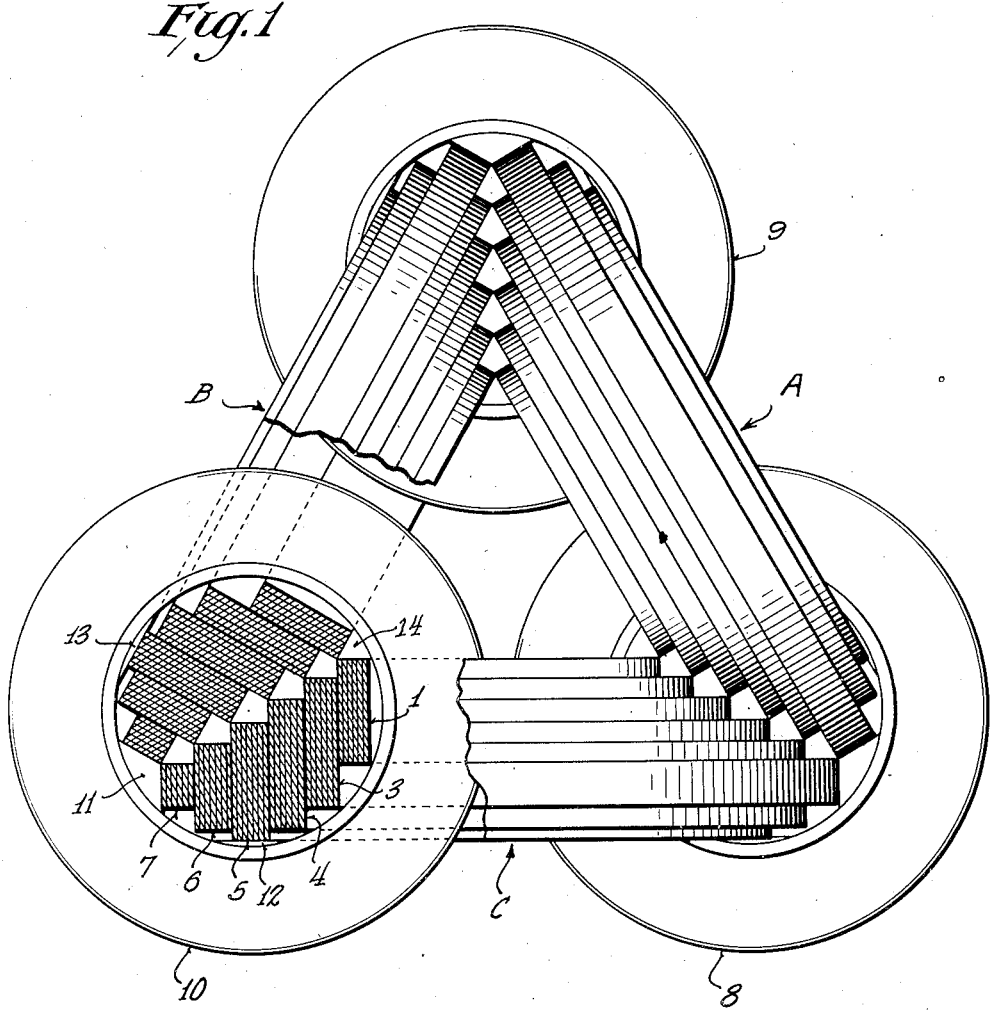
Figure 1 is a plan view of the transformer, with parts broken away and parts in section.

Referring to the drawings, it will be seen that the three phase transformer is provided with three cores indicated generally at A, B and C. These cores are identical and a description of one will therefore suffice. Each of the cores is formed by winding a closed core of magnetic ribbon. The material used in making the cores is any suitable type of magnetic ribbon, though it is preferable to use silicon steel which may be either hot rolled or cold rolled as this material has been found highly efficient in the manufacture of transformers.

Each core is provided with an inner core section 1 which is formed of wound magnetic ribbon of a predetermined width as indicated particularly in Figure 1. After this core has been completely wound, the end is tack welded, brazed, or otherwise secured as indicated by the reference character 2 in Figure 2. Thereafter a second section 3 is wound outside of and surrounding the first section 1 and its end is similarly tack welded or brazed. Thereafter succeeding sections 4, 5, 6 and 7 are wound. In each instance the end is tack welded, brazed or otherwise secured.

In winding these core sections they may be wound on a shaped mandrel to provide the rectangular window for the conducting windings as shown in Figure 2, or they may be wound on a round mandrel and thereafter shaped to the form shown in Figure 2. After the cores have been completely wound and shaped, they are then annealed. It is preferable to clamp each of the composite cores in such a manner that their shape is maintained during annealing. After annealing the cores are not worked in any manner whatsoever. They are neither bent nor machined and consequently no stresses are imparted to the cores. The three cores are arranged in the form of an equilateral triangle as shown in Figure 1 and conducting winding assemblies indicated by the reference characters 8, 9 and 10 are wound in place around the adjacent legs of each of two core sections as shown most clearly in Figure 1. The expression "conducting winding assemblies" is to be understood to include both the primaries and the secondaries. These conducting winding assemblies are wound on the finished annealed cores in any suitable manner. For example, the winding machine disclosed in the patent to Steinmayer et al. 2,305,999 of December 22, 1942, for Method and machine for winding coils could be used.

It is to be noted that the cores each have a straight section and that the conducting winding assemblies are formed about these straight sections. These conducting winding assemblies are round wound to thereby secure all of the advantages inherent in round wound conducting winding assemblies. Round wound conducting winding assemblies resist distorting forces due to short-circuiting or similar conditions better than rectangular preformed coils as the circular coil is considerably stronger than the rectangular coil. In addition to the above enumerated advantage, the winding of circular conducting winding assemblies entails less danger of damage to the insulation during winding than where a rectangular conducting winding assembly is employed as the round wound conducting winding assembly requires less tension on the wire during winding and requires no pounding of the coil to make a firm coil.

It is to be noted that in winding the closed cores, a very compact arrangement is obtained for each core. The succeeding sections of the core may be wound tightly on the preceding sections and a very compact arrangement is obtained. In addition to this it is to be noted that by staggering the succeeding sections of each core and by varying their width, as shown in Figure 1, a good space factor is obtained. Another important result is obtained as the invention provides a three phase transformer in which closed wound cores interlink each of the three conducting winding assemblies without any break or transverse joint in any of the cores, and that each closed wound core extends directly from the window of one conducting winding assembly to the window of an adjacent conducting winding assembly.

After the winding assemblies have been completed, any suitable type of wedges may be employed to prevent shifting of the conducting winding assemblies. For example, wedges indicated by the reference character 11, 12, 13 and 14 may be driven in place, as shown in Figure 1.

It will be seen that a three phase transformer has been provided in which the three conducting winding assemblies are arranged with their axes parallel and located at the apexes of an equilateral triangle and a symmetrical arrangement is thus obtained allowing the transformer to be mounted within a circular tank.

Each winding assembly surrounds or interlinks two adjacent cores and the magnetic flux does not at any time have to pass from one core to another core.

The magnetic ribbon has a grain due to rolling which extends lengthwise of the ribbon and is most permeable to magnetic flux along the grain, that is, lengthwise of the ribbon. This invention utilizes this most permeable path as the magnetic flux is lengthwise of the ribbons in all the core sections.

In addition to this, the process of making the transformer may be very rapidly followed and requires a very small number of operations to produce the finished transformer.

Also it will be seen that a very small exciting current is required as the magnetic ribbon forming the core sections is continuous and is not broken by cross cuts with the resulting air gaps but instead is, as stated, formed of continuous closed wound magnetic ribbon.

Although this invention has been described in considerable detail, it is to be understood that such description is intended as illustrative rather than limiting, as the invention may be variously embodied and is to be interpreted as claimed.

I claim:

1. A three phase transformer comprising three circular conducting winding assemblies having circular windows, and three cores each interlinking two of the conducting winding assemblies with each conducting winding assembly surrounding portions of two adjacent cores, said cores being closed cores formed of wound magnetic ribbon, and each core being formed of closed sections, certain of the sections being arranged in a staggered relation with the planes of the magnetic ribbon in one core arranged at an obtuse angle to planes of the magnetic ribbon in the adjacent portion of the next core, said cores substantially filling the circular windows of the conducting winding assemblies to provide a good space factor.

2. A three phase transformer comprising three circular conducting coil assemblies having circular windows and having parallel axes, and three closed cores, each core interlinking two of the conducting coil assemblies and having straight leg portions where they extend through the circular windows of the conducting coil assemblies, a leg portion of each of two cores extending through each window, the planes of the ribbon in adjacent leg portions being arranged at approximately 120 degrees to each other, each core being composed of a plurality of closed sections formed of wound magnetic ribbon and having the outermost section of narrowest width and having certain of the sections staggered, the leg portions of adjacent cores occupying opposite halves of the circular window of the corresponding conducting coil assembly, each pair of straight leg portions substantially filling the circular windows of the conducting coil assemblies to provide a good space factor.

3. A core construction for a three phase transformer comprising three symetrically arranged closed cores formed of wound magnetic ribbon, each core having a pair of leg portions connected by a pair of yoke portions and being composed of a plurality of closed sections arranged one within the other with certain of the sections of different widths, the leg portions of successive cores being arranged with their inner side faces in close proximity to each other, the sections forming a core being staggered in the same direction progressively from the innermost section to the outermost section on the inner faces of the leg portions and being staggered in reverse directions progressively from the innermost section to the outermost section on the outer faces of the leg portions, the width of successive sections and the staggered arrangement giving a cross sectional contour of adjacent leg portions which will substantially fill a circle.

4. A core construction for a three phase transformer comprising three symmetrically arranged closed cores formed of wound magnetic ribbon, each core having a pair of straight leg portions connected by a pair of curved yoke portions and being composed of a plurality of closed sections arranged one within the other with certain of the sections of different widths, the leg portions of successive cores being arranged with their inner side faces in close proximity to each other, the sections forming a core being staggered in the same direction progressively from the innermost section to the outermost section on the inner faces of the leg portions and being staggered in reverse directions progressively from the innermost section to the outermost section on the outer faces of the leg portions, the width of successive sections and the staggered arrangement giving a cross sectional contour of adjacent leg portions which will substantially fill a circle.

WALTER R. MAYBERRY.